(12) United States Patent
Kiehn et al.

(10) Patent No.: US 8,723,955 B2
(45) Date of Patent: May 13, 2014

(54) DETECTION APPARATUS

(75) Inventors: Michael Kiehn, Hamburg (DE); Mauri Aikio, Kempele (FI); Mika Aikio, Oulu (FI)

(73) Assignee: Sick AG, Waldkirch (DE)

( * ) Notice: Subject to any disclaimer, the term of this patent is extended or adjusted under 35 U.S.C. 154(b) by 837 days.

(21) Appl. No.: 12/654,513

(22) Filed: Dec. 22, 2009

(65) Prior Publication Data

US 2010/0165082 A1    Jul. 1, 2010

(30) Foreign Application Priority Data

Dec. 23, 2008  (EP) .................................... 08022431

(51) Int. Cl.
*H04N 7/18* (2006.01)
*H04N 5/30* (2006.01)
*H04N 5/33* (2006.01)

(52) U.S. Cl.
USPC ........... 348/152; 348/143; 348/161; 348/162; 348/164

(58) Field of Classification Search
USPC .......................... 348/143, 152, 161, 162, 164
See application file for complete search history.

(56) References Cited

U.S. PATENT DOCUMENTS

| 3,786,757 A | 1/1974 | Goldstein et al. |
| 5,018,447 A | 5/1991 | Miller, Jr. et al. |
| 5,914,692 A * | 6/1999 | Bowers et al. ................. 343/742 |
| 6,204,916 B1 * | 3/2001 | Norita et al. ............... 356/141.1 |
| 6,727,938 B1 * | 4/2004 | Randall ......................... 348/143 |
| 7,411,486 B2 * | 8/2008 | Gern et al. ................... 340/438 |
| 2003/0197652 A1 * | 10/2003 | Yang et al. .................... 343/742 |
| 2005/0140319 A1 * | 6/2005 | Takashima .................... 318/286 |
| 2005/0219361 A1 * | 10/2005 | Aoki et al. .................... 348/159 |
| 2007/0039030 A1 * | 2/2007 | Romanowich et al. ........ 725/105 |
| 2007/0185587 A1 * | 8/2007 | Kondo ............................ 700/19 |
| 2008/0049975 A1 * | 2/2008 | Stiegler ........................ 382/104 |
| 2008/0225121 A1 * | 9/2008 | Yoshida et al. ............... 348/159 |
| 2010/0121577 A1 * | 5/2010 | Zhang et al. .................. 701/301 |
| 2010/0302138 A1 * | 12/2010 | Poot et al. ..................... 345/156 |

FOREIGN PATENT DOCUMENTS

| EP | 2 124 069 A1 | 11/2009 |
| GB | 2131642 A | 6/1984 |
| WO | WO 01/59890 A1 | 8/2001 |

* cited by examiner

*Primary Examiner* — Rupal Dharia
*Assistant Examiner* — Joe Chacko
(74) *Attorney, Agent, or Firm* — Nath, Goldberg & Meyer; Jerald L. Meyer (57) ABSTRACT

An apparatus for spatially resolved detection of objects has transmission and reception devices, in which transmission and reception regions overlap or intersect in a detection region which is disposed within a monitored zone. The monitored zone covers a detection angle in which the transmitted radiation is reflected by objects. An imaging arrangement is disposed in the propagation path of the transmitted radiation and/or of the reflected radiation and covers the total detection region at the transmission side and/or at the reception side at all times. Spatial resolution is used for influencing the propagation direction of the radiation and/or for the operation of the reception device, in a time varying manner, such that the spacing of the detection region relative to the imaging arrangement and/or the size of the detection region determined by the degree to which the transmission region and the reception region overlap or intersect changes.

19 Claims, 1 Drawing Sheet

US 8,723,955 B2

DETECTION APPARATUS

BACKGROUND

1. Field

The present disclosure relates to an apparatus for the spatially resolved detection of objects located in a monitored zone having a transmission device for the transmission of electromagnetic radiation in a transmission region and having a reception device for the reception of radiation reflected from a reception region, with the transmission region and the transmission region overlapping or intersecting in a detection region which is disposed within the monitored zone, which covers a detection angle and in which the transmitted radiation is reflected by objects.

2. Background

Such detection apparatus are generally known, e.g. in the form of laser scanners which are formed as scanning laser distance measurement apparatus and which scan the detection region with a laser beam in a time pulsed or continuous manner. The distance measurement takes place in this respect e.g. in accordance with a time of flight (TOF) measurement principle or a phase measurement principle.

Such detection apparatus are mounted e.g. on vehicles to scan the vehicle environment and hereby to recognize objects such as other road users in the visual range of the apparatus. The vehicle is hereby so-to-say able to make a spatially resolved image and also—due to the possibility of measuring distances—a depth resolved image of its environment, with this environmental detection taking place in real time. A variety of applications are possible with the environmental data gained in this manner. Such detection apparatus are also used in industrial applications. It is in particular known for scanning TOF laser distance measurement units which should monitor a comparatively large angular range of up to 360° in at least one transmission or detection plane to deflect the scanning laser beam which is in principle one-dimensional, that is the transmitted radiation, within this plane with a preset angular resolution also determining the spatial resolution. It is known for this purpose to deflect the scanning beam—also called a measurement beam or travel beam—in the detection apparatus—also simply called sensors—by means of a motor-moved rotating prism or by means of a rotating mirror tilted e.g. by 45° to the optical axis. In these cases, the axis of rotation of the prism or of the mirror and the optical axis of the sensor extend parallel to one another. In an alternative aspect, the total electro-optical unit of the sensor can be set into rotation. In this respect, both the transmission aperture and the reception aperture are moved on a circular path to ensure that the scanning beam of the sensor sweeps over the desired angular range of up to 360°.

The aforesaid solutions have the disadvantage that comparatively large masses have to be moved, in particular set into rotation. The electrical power required for this purpose contributes to a not insubstantial degree to the total power consumption of the sensor. It is furthermore of disadvantage that the required storage of the rotating components significantly limits the service life of the sensor.

To eliminate these disadvantages, it has already been proposed to provide an imaging arrangement in the propagation path of the transmitted radiation and/or of the reflected radiation which covers the whole detection region at the transmission side and/or at the reception side at all times, with spatial resolution means additionally being provided which are formed to distinguish the reflected radiation with respect to the reflection site. For this purpose, reference is made to the not yet published European patent application of the applicant with the file reference EP 08 005 342 filed on Mar. 20, 2008. Although solutions are provided with this which work satisfactorily, there is still a need to improve the detection of objects. It is in particular difficult to impossible with the solutions described in the named application to scan the monitored zone at different vertical positions, i.e. the known solutions are so-to-say not capable of elevation with respect to a practical implementation capability. In practice, however, it is desirable to scan the monitored zone not only in a single plane, in particular a horizontal plane, in an angular range of up to 360°, but it is additionally desirable for a number of applications additionally to carry out the scanning at different vertical positions.

A further problem in connection with the known solutions is the fact that the sensitivity of such a detection apparatus, in particular of a laser scanner, is generally a function of the object distance as well as of the offset between the optical transmission system and the optical reception system. In a number of cases, the design of the detection apparatus has the effect that the optical transmission system and the optical reception system cannot be arranged so close to one another as would be desirable for a sensitivity of the detection apparatus satisfying specific demands. In particular an insufficient sensitivity or even "blindness" in the so-called near zone of the detection apparatus results from this since a sufficient overlap of the transmission region and of the reception region is only adopted at larger distances from the detection apparatus.

BRIEF DESCRIPTION OF THE DRAWINGS

The present disclosure will be described in the following by way of example with reference to the drawing. There are shown.

DETAILED DESCRIPTION

Overview

It is the object of the disclosed technology to further develop a detection apparatus of the initially named kind such that the disadvantages mentioned above are avoided, with a reliable detection of objects located in a monitored zone not only being achievable over an angular range which is as large as possible, in particular of up to 360°, but additionally an object detection being able to be achieved at different vertical levels, in particular with a design which is as simple as possible, not prone to defects and ensures a service life which is as long as possible and with the possibility additionally being given of eliminating insufficiencies with respect to the sensitivity of the detection apparatus as largely as possible.

This object is satisfied by the features of an apparatus for the spatially resolved detection of objects (13) located in a monitored zone (11), having a transmission device (43) for the transmission of electromagnetic radiation (17) in a transmission region (19); having a reception device (41) for the reception of radiation (25) reflected from a reception region (23), wherein the transmission region (19) and the reception region (23) overlap or intersect in a detection region (27) which is disposed within the monitored zone (11), which covers a detection angle and in which the transmitted radiation (17) is reflected by objects (13), having an imaging arrangement (29) which is disposed in the propagation path of the transmitted radiation (17) and/or of the reflected radiation (25) and which covers the total detection region (27) at the transmission side and/or at the reception side at all times; and having spatial resolution means (31) for the influencing of the propagation direction of the radiation (17, 25) and/or for the operation of the reception device (41), in particular in a time varying manner, such that the position, in particular the spacing, of the detection region (27) relative to the imaging arrangement (29) and/or the size of the detection region (27) determined by the degree to which the transmission region (19) and the reception region (23) overlap or intersect can be changed.

Provision is in particular made that the apparatus includes an imaging arrangement which is disposed in the propagation path of the transmitted radiation and/or of the reflected radiation and which covers the total detection region at the transmission side and/or at the reception side at all times as well as spatial resolution means which are designed to influence the propagation direction of the radiation and/or to operate the reception device, in particular with time variance, and indeed such that the position of the detection region relative to the imaging arrangement, in particular the spacing of the detection region from the imaging arrangement, and/or the size of the detection region determined by the degree to which the transmission region and the reception region overlap or intersect can be varied.

The present disclosure is based on the idea of not accepting the position and/or size of the detection region relative to the imaging arrangement and thus relative to the detection apparatus or to an object, for example a vehicle, to which the detection apparatus is attached and the conditions resulting from this position and/or size of the detection region as an unavoidable property of the detection apparatus, but rather to provide means with which the position and/or the size of the detection region can be changed, and indeed means which influence the propagation direction of the radiation accordingly and/or operate the reception device accordingly.

Two general options are thus provided to achieve the spatial resolution, with these two options being able to be used alternatively or together.

In accordance with the one option, the propagation direction of the radiation is influenced. It can hereby be achieved at the reception side, for example, that the reception device so-to-say receives radiation from the "right" direction at the "right" time. The reception device hereby does not itself have to be capable of spatial resolution, with this, however, not being precluded.

In accordance with the other option, an influencing of the propagation direction of the radiation is not necessary. It is rather the case here that the spatial resolution is achieved by a corresponding operation of the reception device. In this respect, in particular a reception device is provided which is itself capable of spatial resolution. A 3D camera is, for example, used which has a plurality of individual receivers—called pixels in the following—or a plurality of individual reception devices. In this respect, each pixel "looks" in a different direction so that the totality of all reception regions of the pixels forms the reception region of the reception device. Such a 3D camera therefore "looks" in all directions of interest simultaneously at all times so that—as stated—no influence needs to be taken on the propagation direction of the radiation to achieve the desired spatial resolution. To ensure that the radiation originating from the respective direction of interest is supplied to the evaluation, the reception device, for example, the 3D camera, is operated accordingly in that in each case the "right" pixels are evaluated or read out. A 3D camera is here consequently understood as a reception device which itself already delivers a spatially resolved image of the detection region or of at least a part thereof so that the 3D camera itself does not need to be moved and also no further devices such as mirrors, for example, are required to direct the radiation reflected from the reception region to the 3D camera in any form or manner. Nevertheless, the use of such a 3D camera does not preclude either a movement of the 3D camera in any form or manner or the provision of means to influence the propagation direction of the radiation. In addition, a 3D camera such as is understood within the framework of the present disclosure is characterized in that it not only delivers a spatially resolved image, but also a depth resolved image. In other words, each pixel or each group of pixels combined in a suitable manner delivers a distance value in addition to a brightness value and/or a color value. Such 3D cameras are generally known, for example in the form of PMD (photonic mixer device) sensors. Such PMD sensors work, for example, according to the phase difference process, i.e., the distance is determined by the phase shift between transmitted radiation and received radiation. In particular such radiation having a wavelength in the infrared range is used as the radiation here. A radiation source can be used at the transmission side in conjunction with such a PMD sensor used as a receiver or with any other suitable 3D camera, said radiation source simultaneously "illuminating" the total detection region, with this illumination being able to take place in a continuous or pulsed manner. A means for the influencing of the propagation direction of the radiation is consequently not required either at the reception side or at the transmission side in this aspect of the present disclosure. Such an apparatus consequently advantageously does not include any components which need to be moved in any form or manner for the desired spatially resolved detection of objects located in the monitored zone. Nevertheless, for various reasons, for example for an increase in the range, for an increase in eye safety and/or for an increase in the service life of the transmission device, a direct transmission of the radiation in time and/or space can take place with an operation of the 3D camera on the reception side which is adapted accordingly, in particular synchronized in time and/or space.

The vertical position of the detection zone can e.g. be varied, which allows a quasi-three dimensional scanning of the monitored zone. In addition, influence can also be taken on the sensitivity properties of the detection apparatus by the change of the position and/or size of the detection region.

The following must generally still be noted with respect to the detection apparatus:

The detection region is that region of the monitored zone into which the apparatus so-to-say "looks" both with the transmission device and with the reception device. In other words, the detection region is that region in the environment of the apparatus in which objects can be detected, i.e. "seen", by the apparatus. It is basically possible that the transmission region and the reception region more or less coincide. This is, for example the case with a so-called coaxial arrangement of a transmitter of the transmission device and of a receiver of the reception device or of the corresponding optical systems. In a so-called biaxial arrangement, in contrast, the transmitter and the receiver "look" onto the detection region from different directions. In particular an overlap of the transmission region and the reception region in a near zone of the detection apparatus can be omitted in such an arrangement—with fixed "directions of gaze" of the transmitter and of the receiver.

The spatial resolution of the apparatus is also determined by the size of the cross-section which a beam transmitted into the reception region has on an object at which the beam is reflected. In this respect, the spatial resolution can be dependent on the distance between the detection apparatus and the object when the transmitted beam has a divergence, i.e. expands. The imaging properties of the optical devices used of the transmission device, in particular of the imaging arrangement, provided this is active at the transmission side, also play a role here.

Since the imaging arrangement covers the total detection region, the imaging arrangement "sees" a plurality of (possible) reflection sites at all times, with "possible" having to be understood here such that it is actually only possible to speak of a reflection site when there is an object in the detection region at which a reflection can take place. In other words, the imaging arrangement is simultaneously able to generate a plurality of reflection sites at an object located in the detection region (coverage at the transmission side) and/or to "see" a plurality of reflection sites and to image them on the reception device (coverage at the reception side).

So-to-say as "compensation" for such a simultaneous coverage of the total detection region, means, namely the spatial resolution means, are provided with the goal of a spatially resolved detection of the objects located in the monitored zone which allow spatial resolution or which are designed to distinguish the reflected radiation with respect to the reflection site.

The disclosed technology has the advantage that the imaging arrangement does not need to be moved since it is able to cover the total detection region at all times. The spatial resolution means can be realized in a variety of ways.

The disclosed technology in particular makes it possible to fully dispense with a movement of components for the desired spatial resolution or to reduce the masses to be moved for the desired spatial resolution to a minimum.

The special advantage of the disclosed technology lies in the fact that the spatial resolution means not only enable the spatial resolution, but additionally serve to change the position and/or size of the detection region.

The detection angle covered, i.e. "seen", by the imaging arrangement can generally be selected in any desired size. It is thus possible that the imaging arrangement covers a detection angle of at least 90°, preferably of at least 180°, and in particular preferably of 360°. In the latter case, a sensor with "all-round view" is present.

The detection apparatus is preferably designed as a distance measurement unit. A distance value can in particular be determined for every (possible) reflection site. The apparatus can be designed for distance measurement in accordance with the time of flight principle and/or in accordance with the phase measurement principle. The apparatus is in particular designed as a laser scanner which scans the detection region in a time pulsed or continuous manner with at least one transmitted laser beam.

The size of the detection region which is determined by the degree to which the transmission region and the reception region overlap or intersect can be changed. The size of the detection region determines the intensity of the reflected radiation detectable by the receiver. The change in the size of the detection region therefore opens up the possibility of influencing the sensitivity of the detection apparatus. It will be explained in more detail in the following how this possibility can be used for applications relevant in practice.

The spatial resolution means are preferably arranged in the propagation path of the radiation between a transmitter of the transmission device and the imaging arrangement and/or in the propagation path of the radiation between the imaging arrangement and a receiver of the reception device and/or the spatial resolution means include such means which operate a receiver of the reception device in a spatially resolved manner, with the receiver preferably being designed as a 3D camera, in particular preferably as a PMD sensor.

Provision can furthermore be made that the spatial resolution means include at least one movable optical element, in particular a mirror, a prism or a wedge, electrically controllable for the carrying out of deflection movements and/or at least one diffractive optical system electrically controllable for the change of the radiation-refracting behavior and/or means which operate a receiver of the reception device in a spatially resolved manner, with the receiver preferably being designed as a 3D camera, in particular preferably as a PMD sensor. Spatial resolution means of this type are generally known. In a preferred embodiment, in each case at least one so-called micromechanical mirror (MEMS) is used at the transmission side and/or at the reception side, with this, however, not being compulsory. In another preferred embodiment, a 3D camera, in particular a PMD sensor, is provided at the reception side.

The option of using a 3D camera or a PMD sensor was already looked at above. A spatial resolution can therefore be achieved at the reception side without moving parts using such a 3D camera in that the pixels of the 3D camera are read out directly in a specific manner. The direction in which each pixel "looks", i.e. which part region of the detection region is covered by which pixel, is known on the basis of the arrangement and/or alignment of the 3D camera with respect to the detection region. A detected reflection site in the detection region can consequently be clearly associated by a corresponding evaluation and/or read-out procedure of the pixels of the 3D camera. The operation of the 3D camera can be synchronized with the operation of the transmission device to the extent that, with a time varying propagation direction of the transmitted radiation into the detection region, the right direction is "looked" into at the reception side at all times in that the right pixel or the right pixel group "looking" into the corresponding part region of the detection region is evaluated and/or read out at the right time.

The disclosed technology consequently makes it possible to minimize the masses to be moved for the environmental detection. A transmitter, for example a laser source, of the transmission device, a receiver, for example one or more photodiodes or a 3D camera, of the reception device and the imaging arrangement which, for example, includes two panoramic lenses or omnidirectional lenses of which the one is associated with the transmission device and the other is associated with the reception device can be arranged immovably with respect to a base of the detection apparatus, i.e. with respect to a coordinate system associated with the detection apparatus.

The imaging arrangement is preferably designed for the deflection of the transmitted radiation and/or of the reflected radiation.

In an embodiment, the imaging arrangement includes at least one surface, in particular an at least partly ring-shaped surface, with the angle at which the radiation incident onto the surface from the transmission device at the transmission side and/or the angle at which the radiation coming from the surface is incident onto the spatial resolution means at the reception side being able to be changed by means of the spatial resolution means.

The positional change and/or size change of the detection region thus takes place in a very simple manner by the change of the named angles made possible by means of the spatial resolution means. A property, in particular a geometrical property, of the imaging arrangement can thus be utilized with the surface of the imaging arrangement provided in this respect to achieve the desired change of position and/or size of the detection region in a simple manner and in particular without any movement of the imaging arrangement itself.

The surface mentioned can, for example, be a closed, planar ring surface which extends in inclined form to an optical axis of the imaging arrangement and at which, at the transmission side, the radiation transmitted by the transmission device and/or, at the reception side, the radiation reflected in the monitored zone is reflected. The imaging arrangement can in particular have such a surface at the transmission side and such a surface at the reception side. With a corresponding relative arrangement, a change of the angle of incidence onto this surface (at the transmission side) or onto the spatial resolution means (at the reception side) which can be realized by means of the spatial resolution means leads to a change in the alignment of the transmission region or of the reception region and thus to a change in position and/or size of the detection region. At the transmission side, while utilizing the surface of the imaging arrangement, the direction in which the radiation is transmitted into the monitored zone is consequently directly preset (=alignment of the transmission region), with provision being made on the reception side that the radiation reflected in the monitored zone and reaching the spatial resolution means via the said surface of the imaging arrangement reaches the reception device, the detection apparatus so-to-say "looks" (=alignment of the reception region) in the right direction.

If the angle at which the spatial resolution means direct the radiation transmitted by the transmission device onto the surface of the imaging arrangement remains constant, the scanning of the monitored zone then only takes place in one single scanning plane, and indeed over a detection angle of 360° in the case of a closed ring surface. The spatial resolution means are then only effective to describe a circular path on the ring surface of the imaging arrangement with the radiation transmitted by the transmission device. The direction of the radiation coming from the ring surface, and thus the alignment of the transmission region, and thus ultimately the position and/or size of the detection region, changes due to the additionally occurring change in the angle. A plurality of circular paths with different radius can thus be traveled through sequentially on the surface of the imaging arrangement, for example, in this manner at the transmission side by means of the spatial resolution means. Each circular path provides a scanning of the monitored zone in a specific vertical position so that an elevation capability of the sensor is achieved. Different radii of the circular paths correspond to different vertical positions of the scanning in the monitored zone. Alternatively, a path can be described on the ring surface which deviates from a circle, for example a spiral or helical path. The manner how the scanning of the monitored zone also takes place with respect to the vertical position is thus also practically not set any limits by the disclosed technology.

It is also possible to use such spatial resolution means which project a, for example, grid-shaped pattern onto the surface of the imaging arrangement. Since all the decisive parameters of such a system are known, a scanning can take place which is generally of any desired type, e.g. at different vertical positions, by a selective evaluation of the reception device taking place at the reception side. A scanning, for example at different vertical positions, therefore takes place in this respect by a corresponding evaluation of the received radiation or by a corresponding operation, in particular by a corresponding control, read-out and/or evaluation, etc. of the receiver which is in particular designed as a 3D camera. The elevation capability of the apparatus can therefore generally be achieved in that the impinging of the surface provided at the imaging arrangement by means of the radiation transmitted by the transmission device does not only take place on one radius or not only with punctiform radiation.

Alternatively or additionally to an alignment of the transmission region and/or of the reception region by means of the spatial resolution means, provision can also be made in accordance with a generally independent aspect of the disclosed technology to provide the surface provided at the imaging arrangement at the transmission side and/or at the reception side with a specific extent or a specific shape so that different alignments of the transmission region are also achieved with a constant angle of the incident radiation with respect to the optical axis during a scan. The surface can e.g. be a ring surface whose inclination to the optical axis varies in the peripheral direction. The surface at the reception side can in this respect have a corresponding extent so that a desired synchronization is given between the transmission side and the reception side.

The imaging arrangement preferably includes at least one optically effective element, in particular a lens, preferably a panoramic lens and/or an omnidirectional lens, or a radiation reflection surface, preferably an at least partly conical mirror. The term "lens" should be understood widely within the framework of the present disclosure and in particular in a manner deviating from a possibly given conventional understanding such that the lens is also capable of radiation reflection.

Such optically effective elements, in particular the mentioned panoramic lenses or omnidirectional lenses, are generally known. The use of such lenses takes place e.g. in the field of video applications. The disclosed technology advantageously makes use of the property of such optically effective elements to be able to cover a large detection region, which in particular includes a detection angle of up to 360°, at once without the elements having to be moved, in particular rotated, for this purpose. The disclosed technology thus enables the use of such optically effective elements in an apparatus for the spatially resolved environmental detection, in particular of panoramic lenses or omnidirectional lenses, in conjunction with a laser scanner. Since there is no longer any need to move components having a comparatively large mass, in particular to set them into rotation, the service life of the detection apparatus is significantly increased. Furthermore, the disclosed technology provides a relevant reduction of the power consumption of the detection apparatus.

In a further possible embodiment of the present disclosure, the imaging arrangement includes a common imaging device which is effective both at the transmission side and at the reception side. This is, however, not compulsory. It is also possible that the imaging arrangement includes a respective separate imaging device both at the transmission side and at the reception side. These two imaging devices can in particular be made the same construction-wise, in particular identical. A basic structure of the detection apparatus which is provided in accordance with a further embodiment and is symmetrical with respect to at least the basic arrangement and effect of the optical components is hereby made possible, with the symmetry being given with respect to a plane separating the transmission side from the reception side. "Symmetrical" should not be interpreted too narrowly in this respect. Differences between the reception side and the transmission side which are required or advantageous with respect to the specific functions of the transmission device, on the one hand, and the reception device, on the other hand (e.g. differences in the size of the effective reception surface, on the one hand, and of the effective transmission surface, on the other hand) which do not change anything in the basic symmetrical construction should rather also be covered by the term "symmetry". It is thus naturally endeavored to design the optical reception system in dependence on the size of the receiver and in particular as large as possible so that the received power is as high as possible. At the same time, in contrast, a clearly smaller optical transmission system can be sufficient.

The present disclosure also relates to a method for the spatially resolved detection of objects located in a monitored zone by means of an apparatus, in particular by means of an apparatus in accordance with one of the preceding embodiments, which includes a transmission device for the transmission of electromagnetic radiation in a transmission region and a reception device for the reception of radiation reflected from a reception region, with the transmission region and the reception region overlapping or intersecting in a detection region which is disposed within the monitored zone, which covers a detection angle and in which the transmitted radiation is reflected by objects and with the apparatus including an imaging arrangement which is disposed in the propagation path of the transmitted radiation and/or of the reflected radiation and which covers the total detection region at the transmission side and/or at the reception side at all times, with the propagation direction of the radiation being influenced and/or the reception device being operated in the method such that the position, in particular the spacing, of the detection region relative to the imaging arrangement and/or the size of the detection region determined by the degree to which the transmission region and/or the reception region overlap or intersect changes/change.

As already mentioned above, a plurality of paths of at least partly circular shape with different radius and/or a path deviating from a circle, in particular a spiral or helical path, can be described on the surface sequentially at the transmission side by means of the spatial resolution means in conjunction with an imaging arrangement which includes at least one surface, which is in particular at least partly of ring shape.

Provision is in particular made in this respect that the spatial resolution means are operated synchronously or adapted to one another with respect to the transmission side, on the hand, and the reception side, on the other hand, such that—figuratively speaking—the reception device always "looks" where the transmission device is "illuminating".

The possibility is achieved by the change of the size of the detection zone achievable in accordance with an aspect of the present disclosure to influence the sensitivity of the detection apparatus and in particular the development of the sensitivity in dependence on the distance from the detection apparatus. The intensity of the radiation received by the reception device is maximum when the transmission region and the reception region have maximum overlap. The sensitivity can thus be directly influenced by changing the degree of overlap. The degree of overlap can generally be set as desired, also in a manner varying with time, by a corresponding operation or control of the spatial resolution means.

Provision is made in a further embodiment of the present disclosure that the size and/or position of the detection region is changed while the radiation transmitted by the transmission device propagates. Sufficiently fast spatial resolution means are available e.g. in the form of the already mentioned diffractive optical systems.

It is thus possible, for example, to change the alignment of the reception region—and thus also the position of the detection region—by a corresponding operation of the spatial resolution means on the reception side and/or of the reception device such that it is always the transmitted radiation—in more precise terms the front of the radiation propagating away from the imaging arrangement or a transmitted radiation pulse—which is looked at. Since the reception device always "looks" where the radiation front or the radiation pulse is located, i.e. where a reflection of the transmitted radiation can take place with an object located in the monitored zone, in this manner during the propagation of the transmitted radiation, a maximum overlap is ensured over the total measurement distance or range of the detection apparatus between the transmission region and the reception region and thus a maximum size of the detection region and thus ultimately a maximum sensitivity of the detection apparatus.

As already mentioned above, the disclosed technology also makes it possible to change the size of the detection region by means of the spatial resolution means. Since sufficiently fast spatial resolution means are generally available, this size change can also take place during the propagation of the transmitted radiation away from the imaging arrangement into the monitored zone. It is in this respect now not necessarily required, as explained in the preceding embodiment, that a maximum overlap and thus a maximum sensitivity is always given between the transmitted region and the reception region. It is rather the case that the degree of overlap and thus the sensitivity can be varied in dependence on the distance of the front of the transmitted radiation or of the transmitted radiation pulse from the detection apparatus. This is also called the control of the reception dynamics of the sensor. A background of this embodiment is this circumstance that a typical extent of the intensity of the reflected radiation is designed with conventional detection apparatus such that the intensity rises fast with short distances and subsequently drops slowly. The direct control of the reception dynamics possible can also be used to combat such a typical intensity extent with the aim of effectively achieving an extent with an intensity constant over the distance from the detection apparatus in that the size of the detection region and thus the sensitivity is varied in accordance with the intensity extent. Figuratively spoken, it can therefore be achieved that during the propagation of the transmitted radiation away from the imaging arrangement into the monitored zone the reception device "looks" with a "more or less widely opened eye" in accordance with the—in particular expected—intensity extent.

In accordance with a further aspect, the present disclosure relates to a use of an imaging arrangement which covers a detection region completely at the transmission side and/or at the reception side at all times, in particular a panoramic lens, an omnidirectional lens or an at least partly conical mirror, in an apparatus for the spatially resolved detection of objects located in a monitored zone, in particular an apparatus in accordance with one of the preceding embodiments, with the apparatus including a transmission device for the transmission of electromagnetic radiation in a transmission region and a reception device for the reception of radiation reflected from a reception region, with the transmission region and the reception region overlapping or intersecting in the detection region which is disposed within the monitored region, which covers a detection angle and in which the transmitted radiation is reflected by objects, with the imaging arrangement being disposed in the propagation path of the transmitted radiation and/or of the reflection radiation, and with the apparatus including spatial resolution means for the influencing of the propagation direction of the radiation and/or for the operation of the reception device, in particular in time varying manner, such that the position, in particular the spacing, of the detection region relative to the imaging arrangement and/or the size of the detection region determined by the degree to which the transmission region and the reception region overlap or intersect is/are changeable.

The disclosed technology can generally be used in a variety of manners, for example in vehicle applications and in industrial applications.

EXAMPLES

Figure 1:
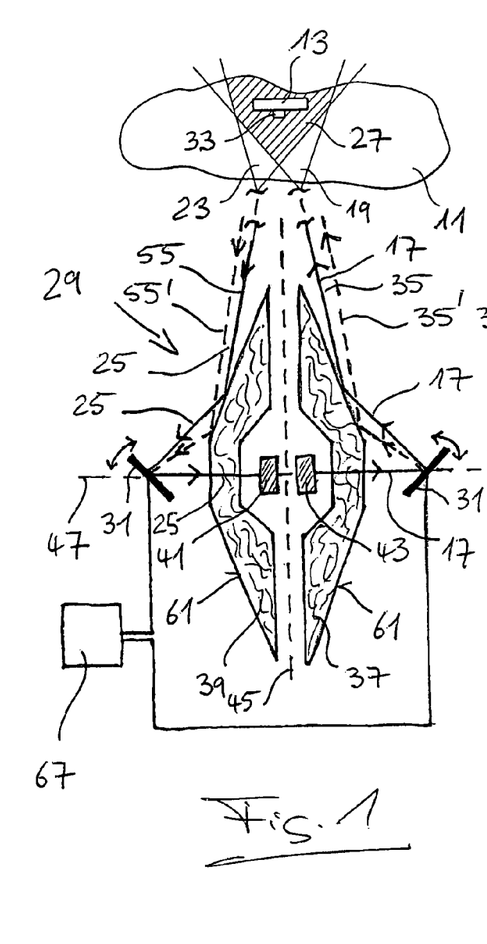
FIG. 1 schematically an embodiment of a detection apparatus.

In the detection apparatus in accordance with FIG. 1, two panoramic lenses 37, 39 are provided which together form an imaging arrangement 29 in the sense of the present disclosure. The two panoramic lenses 37, 39 are made the same construction-wise and are arranged symmetrically with respect to a plane 45. In addition, the two panoramic lenses 37, 39 are rotationally symmetrical with respect to an axis 47 of the imaging arrangement.

The one lens 37 is associated with a transmission device including a transmitter 43, for example a laser source, whereas the other lens 39 is associated with a reception device which includes a receiver 31, e.g. in the form of a photodiode.

In this embodiment, such a photodiode is in particular provided which is not itself capable of a spatially resolved operation. It is rather the spatial resolution means which are described in the following and which are here designed as means for the influencing of the radiation reflected from the reception region which provide the spatial resolution. The photodiode is therefore so-to-say dependent on the fact that it is supplied with the "right" radiation in each case. If, instead of such a photodiode, a 3D camera is used such as was already described above, then such an influencing of the radiation reflected from the reception region is not necessary since the 3D camera is itself capable of a spatially resolved operation in that the pixels forming the 3D camera are read out or evaluated accordingly.

Furthermore, in this embodiment, radiation influencing means 31 serving as spatial resolution means are provided which include spatial resolution means at the transmission side and spatial resolution means at the reception side. These spatial resolution means 31 will be looked at in more detail in the following.

A common control 67 is provided for the spatial resolution means 31 and will likewise be described in more detail in the following. The spatial resolution means are e.g. in each case a micromechanical mirror, a so-called MEMS. Such MEMS can be controlled electrically by means of the control 17 to be able to change the angle at which incident radiation is reflected as desired within specific limits. In the following, the spatial resolution means 31 are also designated simply as a mirror at the transmission side or as a mirror at the reception side.

A special feature of the detection apparatus shown comprises the fact that the transmitter 43 and the receiver 41 are arranged between the two lenses 37, 39, whereby a particularly compact construction results which allows a miniaturization of the detection apparatus.

As regards the basic mode of operation of the detection apparatus, this is indicated in FIG. 1. An object 13 is located in a monitored zone 11. An expansion of the transmitted radiation 17 takes place due among other things to the imaging properties of the transmission lens 37. The transmission of the radiation 17 takes place in a transmission region 19 expanding in the radial direction and covering an angular range around the transmission lens 37 of 360°. A smaller angular coverage can also be provided in alternative embodiments. In this respect, the transmitted radiation 17 is in a first transmission plane 35. The reception side which includes the reception lens 39 which is the same construction wise as the transmission lens 37 accordingly has a reception region 23. The arrangement and configuration of the two lenses 37, 39 are selected such that, on a specific angle of incidence of the transmitted radiation 17 and of the reflected radiation 25 onto a respective planar ring surface 61 of the respective lens 37, 39 oriented at an inclination to the axis 47, the transmission region 19 and the reception region 23 overlap or intersect one another from a specific measurement distance onward. A detection region 27 hereby results which is shown in dashed lines and in which the detection apparatus can detect objects 13.

This situation is shown schematically in FIG. 1 in a plane which includes the common optical axis 47 of the two lenses 37, 39. The detection region 27 is consequently a region of the environment of the detection apparatus which is rotationally symmetrical with respect to the axis 47 and which extends over 360° about the imaging arrangement 29 or the axis 47. The transmitted radiation 17 is reflected by the object 13 at so-called reflection sites of which only one is shown in FIG. 1.

The reception lens 39 is effective in the opposite radiation propagation direction. the radiation 25 reflected from the detection region 27 in a first reception plane 55 is imaged onto the receiver 41 by the reception lens 39, with the mirror 31 at the reception side, whose function will be looked at in more detail in the following, still being located in the propagation path of the radiation.

In an optical respect, the detection apparatus is thus symmetrical with regard to the basic general structure with respect to the plane 45 already mentioned above which separates the transmission side from the reception side and extends perpendicular to the axis 47.

To transmit the radiation 17 in different directions by means of the transmission lens 37, the mirror 31 at the transmission side which serves as the spatial resolution means is arranged in the propagation path of the radiation 17 between the transmitter 43 and the ring surface 61 of the transmission lens 37. This mirror 31 can be caused to make specific movements by means of the control 67, and indeed in two respects. The one movability of the mirror 31, which is not indicated in any more detail in FIG. 1, serves for the generation of the "all-round view" property of the detection apparatus, i.e. for the sequentially occurring impinging on the ring surface 61 of the transmission lens 37 along a circular path about the axis 47, with the angle between the radiation reflected by the mirror 31 and the axis 47, and thus the angle of incidence of the radiation 17 on the ring surface 61, being constant for the total detection angle of 360°. The radiation 17 is consequently transmitted in a single transmission plane 35 into the monitored zone 11. This situation is indicated by solid lines in FIG. 1. The laser beam 17 reflected by the mirror 31 consequently moves—viewed over time—on a cone jacket so that the laser beam exiting the transmission lens 37 rotates about the axis 47 and consequently sweeps over the total detection region 27. A laser scanner is thus realized at the transmission side, with the lens 37 providing the deflection into the detection region 27, however, being arranged in a stationary manner. It is only necessary to move the mirror 31. The desired spatial resolution is ensured by the transmission lens 37 by this scanning at the transmission side despite the complete covering of the detection region 27 given at all times.

Due to the aforesaid basic symmetrical design of the detection apparatus, a mirror 31 controllable by means of the control 67 to make movements is also arranged at the reception side in the propagation path of the reflected radiation 25 between a corresponding ring surface 61 of the reception lens 39 and the receiver 41.

The mirror 31 at the transmission side and the mirror 31 at the reception side can be operated synchronized with one another with respect to its movements by the control 67 such that in each case a laser beam transmitted into the detection region 27 is imaged after reflection at an object 13 on the receiver 41 by means of the receiver lens 39. Figuratively expressed, the detection apparatus at the reception side at all times "looks" where the detection apparatus is "illuminating" at the transmission side.

This selectivity also advantageously ensures among other things that interference radiation incident onto the reception lens 39 and originating from other sources is masked, i.e. does not reach the receiver 41.

A device for the time of flight measurement, not shown, is provided, for example, for the determination of the distance of the object 13 from the detection apparatus. In this respect, the time is measured which the laser radiation requires to cover the path from the transmitter 43 to the object 13 and back to the receiver 41 as reflected radiation 25. In this respect, generally all conventional methods for the distance measurement such as are known e.g. with respect to existing laser scanners can be used for the detection apparatus. The actual distance measurement which is thus known to the person skilled in the art therefore does not have to be looked at in more detail.

As already mentioned above, the above-described movability of the mirrors 31 first ensures that a scanning of the monitored zone 11 takes over a detection angle of—in this embodiment—360° about the axis 47 in a single transmission plane 35 and accordingly in a single reception plane 55. The impinging on the ring surfaces 61 of the lenses 37, 39 takes place in this respect at a constant angle to the axis 47. The position of the detection region 27 with respect to the imaging arrangement 29 formed by the two lenses 37, 39 is consequently likewise constant. The spacing of the detection region 27 from the imaging arrangement 29 measured in the radial direction is in particular constant.

To improve the detection apparatus in this respect the two mirrors 31 are movable via the above-described movement providing the so-called "all-round view" such that the extent of the radiation and thus the alignments of the transmission region 19 and of the reception region 23 change in an additional manner. This additional movability of the mirrors 31 is indicated schematically by the two double arrows in FIG. 1.

At the transmission side, the radiation 17 which is transmitted by the transmitter 43 and which propagates parallel to or coincident with the axis 47 through the transmission lens 37 is deflected by the transmission mirror 31 such that a different angle of incidence of the radiation 17 results on the ring surface 61 of the transmission lens 37. The radiation 17 is consequently transmitted in a second transmission plane 35'. A change—not shown in FIG. 1—of the position of the transmission region 19 hereby results with respect to the two lenses 37, 39 and thus with respect to the detection apparatus. The spacing of the transmission region 19 from the detection apparatus in particular changes, and indeed in dependence on the angle of incidence onto the ring surface 61 toward larger or smaller distances.

In the above-described sense, the mirror 31 at the reception side moves synchronously with the transmission mirror 31 so that a corresponding positional change of the reception region 23 also results. It is hereby ensured that the detection apparatus at the reception side continues always to "look" where there is "radiation" at the transmission side.

A positional change of the detection region 27 thus results overall with respect to the detection apparatus.

This adjustability of the mirrors 31, which can generally be as desired, in particular opens up a variety of application possibilities due to the additional circumstance that this adjustment is sufficiently fast in comparison with the repetition frequency of the transmitter 43 or of the measurement frequency of the detection apparatus. Some of them are shown schematically in FIG. 2 and FIG. 3.

Figure 2:
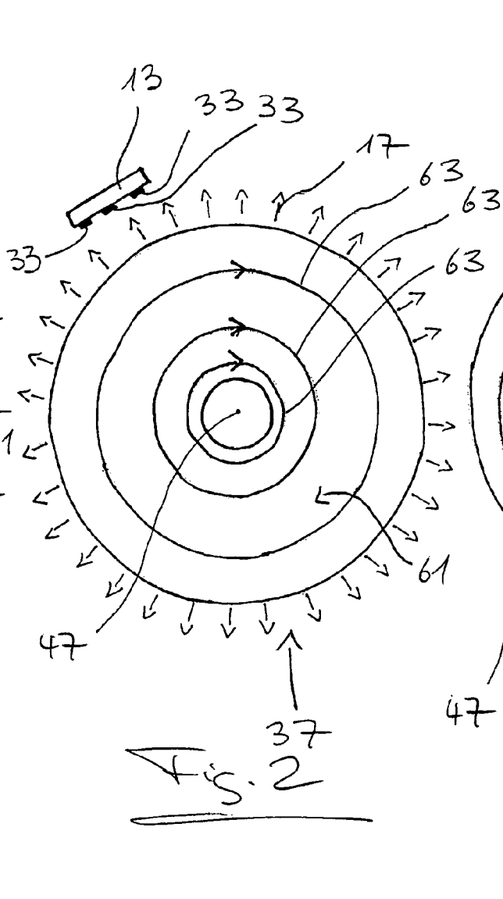
FIG. 2 a plan view of an imaging arrangement of the detection apparatus of FIG. 1 for the explanation of a possible mode of operation.

For example in accordance with FIG. 2, circular paths with different radius can thus be traveled through sequentially by a corresponding control of the transmission mirror 31 and with a correspondingly synchronized movement of the reception mirror 31 on the ring surface 61 of the transmission lens 37. Each circular path 63 in this respect corresponds to a different scanning plane in the monitored zone 11, with these scanning planes differing from one another by their vertical positions or elevations. The cooperation of the transmission mirror 31 with the ring surface 61 thus provides the elevation capability of the detection apparatus, that is its suitability to scan the monitored zone at different vertical positions. This property of a laser scanner is known as multiplane capability.

In a time respect, for example, a scanning can initially take place in a scanning plane over a detection angle of 360°, i.e. at a constant angle of incidence onto the ring surface 61 and thus a constant radius of the corresponding circular path on the ring surface 61. After a full circuit over 360° about the axis 47, the inclination of the transmission mirror 31 with respect to the axis 47 is changed by a predetermined degree, whereby a circular path 63 with a different radius is described on the ring surface 61 and thus a scanning takes place in the monitored zone 11 over a detection angle of 360° in a different vertical position. If a circuit, that is a scanning procedure including 360° is called a "scan" in accordance with terminology frequently used in practice, then the scanning of the monitored region at different vertical positions takes place "scan-wise" in this embodiment: each circular path 63 on the ring surface 61 corresponds to a scan in this respect.

Practically no restrictions are set for the user in the design of monitoring scenarios. The number and the spacings of circular paths 63 with different radius can generally be selected as desired. Nor is it necessary to change the radius of the circular path 63 after every scan. A change in the vertical position can in each case also only take place after a larger number of circuits.

It must still be mentioned with respect to the term "circular path" that in a pulsed laser scanner, that is in a transmitter 43 working in pulsed operation, in strict terms no continuous or uninterrupted circular path is described on the ring surface 61. It is rather the case that the impinging on the ring surface 61 takes place at discrete points sequentially in time due to the pulsed mode of operation, with these, however, being disposed on a circle spaced apart from one another in the peripheral direction.

Such an action on the ring surface 61 should also be considered as taking place on a circular path within the framework of this application.

As regards a possible specific embodiment of the apparatus, the transmitter of the transmission device provided e.g. in the form of a laser diode is operated, for example, in a pulsed manner, and indeed with a pulse repetition rate of 36 kHz, for example. As regards the circulating scanning along the ring surface, work is carried out, for example, an angular resolution of 1°. A so-called scan frequency of 100 Hz hereby results, i.e. the scanning region including 360° is scanned at an angular resolution of 1° 100 times a second. The beam divergence of the transmitted radiation given in the vertical direction amounts, for example, to 1° with a corresponding orientation of the apparatus. In order in particular to compensate pitching movements of vehicles, a vertical opening angle of the scanning of 4° has proved to be sufficient. With the given beam divergence of 1°, such a vertical range of 4° can therefore be covered without a gap by a multiplane scan in four planes. Each plane is consequently scanned with a scan frequency of 100 Hz/4=25 Hz in the named example. Nevertheless, applications are conceivable for which a gap-free vertical coverage can be accepted. Such an application is, for example, the recognition of situations in which a vehicle equipped with the apparatus runs the risk of driving beneath a preceding truck whose structure or load projects to the rear. Such an overhang cannot be recognized with a detection apparatus which only scans in one plane which is aligned more or less horizontally since such a plane is aligned as a rule to the chassis of a truck. To recognize an overhang such as explained above, a vertical angular range of at least 10° should be covered. A gap-free coverage of such a vertical angular region would, however, be sufficient without difficulty for the described purpose. A different application for which an apparatus scanning in two planes would be sufficient is, for example, an arrangement for the detection, in particular for the counting, of persons at passageways. A relatively large opening angle or detection angle of 10°, which does not, however, require any gap-free coverage, is likewise desirable for such applications.

Figure 3:
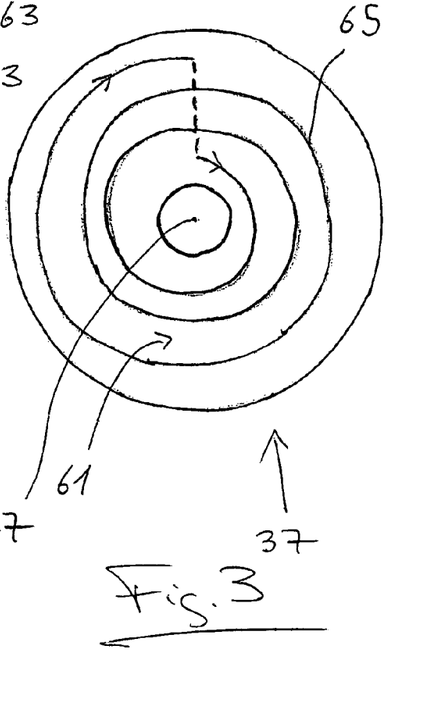
FIG. 3 a view in accordance with FIG. 2 for the explanation of a further possible mode of operation.

A possible alternative scan of the monitored region 11 is shown in FIG. 3. A spiral path 65 is described on the ring surface 61 by means of the transmission mirror 31 here. The scan starts at a small radius, with a return to the spiral start taking place after the reaching of the radially further outwardly disposed end of the spiral. A scan in the opposite direction is also possible. The number of windings of the spiral path 65 can generally be as desired, i.e. a scan traveling through the complete spiral 65 can include a number of 360° circuits of generally any desired number.

The possibility given by the present disclosure for the change of the position of the detection region 27 relative to the detection apparatus does not, or does not only, have to be used for a multiplane scan, that is for a scanning at different vertical positions. It is e.g. also possible to use the detection apparatus permanently or for comparatively long periods of application with a constant position of the detection region 27, i.e. to work with only one single circular path 63 (FIG. 2). The detection apparatus can, however, be adapted—without the necessity of a conversion—at any time to changing external conditions or wishes of the user in that the position of the detection region 27 is changed. This can take place by programming of the control 67. If, for example, a scanning of the monitored zone is not necessary in a near zone in a first application, a circular path 63 on the ring surface 61 can be selected which only effects an overlap of the transmission region 19 and of the reception region 23 at a larger spacing from the detection apparatus. A near zone scanning of the monitored zone can thus be carried out directly or stopped directly.

The movability of the mirrors 31 cannot only be used for the changing of the length of the detection region 37. The size of the detection region 27 can also be alternatively or additionally changed. The size of the detection zone 27 is determined by the degree to which the transmission zone 19 and the reception zone 23 overlap or intersect. The size of the detection zone 27 in turn determines the intensity of the radiation which is detectable at the receiver 41 and thus ultimately the sensitivity of the detection apparatus.

The speed at which in particular electrically controllable diffractive optical systems serving as spatial resolution means 31 can be moved or operated is sufficiently high with respect to the pulse repetition rate of the transmitter 43 or generally with respect to the speed at which sequentially carried out distance measurements take place, to change the alignment of the transmission region 19 and of the reception region 23, i.e. both the position of the detection region 27 and the size of the detection region 27, during the propagation of the radiation 17. The alignment of the transmission region 19, on the one hand, and of the reception region 23, on the other hand, can be changed independently of one another to change the degree of overlap between the transmission region 19 and the reception region 23 and thus the size of the detection region 27. A relative movement can therefore be superimposed on a generally synchronous basic movement of the two spatial resolution means 31 and thus of the transmission region 19 and of the detection region 27 so that—figuratively speaking—the detection apparatus admittedly always "looks" at the reception side where the detection apparatus "illuminates" at the transmission side, with, however, "looking" so-to-say additionally taking place with a "more or less widely opened eye" by varying the degree of overlap between the transmission region 19 and the reception region 23.

As already explained in the introductory part, an extent of the intensity of the reflected radiation 25 depending on the distance from the detection apparatus, such as would result with a continuously maximum degree of overlap, can hereby be changed, for example, in that the degree of overlap is changed, and indeed in particular to the extent that the intensity of the reflected radiation detectable by the receiver 41 is at least approximately constant over the total range or at least over a substantial part of the range of the detection apparatus.

It is additionally indicated by the small arrows in FIG. 2 that the radiation 27 transmitted by the transmitter 43 and directed onto the ring surface 61 of the transmission lens 37 by the transmission mirror 31 exits the transmission lens 37 during a circuit over a detection angle of 360°. On an operation with a pulsed transmitter 43, discrete reflection sites 33, at which the radiation is reflected, thus result on an object 13 located in the monitored zone 11 sequential in time. All reflection sites 33 located in the detection region 27 are "seen" simultaneously by the reception lens 39 at all times. Due to the synchronization of the reception mirror 31 with the transmission mirror 31, however, provision is made that only that radiation reaches the receiver 41 which is reflected at one of the sites 33 for every single distance measurement, that is for every single "shot" of the laser source 34 in the language used in practice.

It must generally be noted that the use of the above-described electrically controllable micromechanical mirror 31 (MEMS) is not compulsory for the alignment of the transmission region 19 and of the reception region 23 which can generally be as desired. As an alternative to such movable mirrors 31, electrically controllable diffractive optical systems can also be used such as are likewise generally known. Furthermore, motor-driven wobbling mirrors can also be used as spatial resolution means 31.

In accordance with the present disclosure, it is generally not compulsory to provide the spatial resolution means 31 both at the transmission side and at the reception side. It is thus possible, for example, to use the spatial resolution means 31 only at the reception side. Provision can in particular be made in this respect that the transmission device is designed to apply transmitted radiation to the total detection region 27 at one moment in time or at all times.

It is in particular possible in this respect to "illuminate", i.e. to apply the scanning radiation, to the total effective surface of the imaging arrangement, that is in the above-described embodiment to the ring surface 61 of the transmission lens 37, by means of the transmitter 43 or by means of a suitable optical transmission system associated with the transmitter 43. The scanning radiation hereby propagates in all designated directions simultaneously at all times. With a detection angle of 360°, the scanning radiation can consequently be reflected simultaneously by all objects which are located around the detection apparatus or its imaging arrangement 29 and within the range of the apparatus. The spatial resolution and in particular the desired position of the detection region 27 relative to the imaging arrangement 29 is in this respect only provided at the reception side, and indeed using spatial resolution means 31, for example an electrically controllable micromechanical mirror (MEMS) such as was described above.

It is alternatively possible to provide such spatial resolution means 31 only at the transmission side and to design the reception side such that the total detection region 27 is always "seen", i.e. is imaged on the receiver 41.

REFERENCE NUMERAL LIST monitored zone
object
transmitted radiation
transmission region
reception region
reflected radiation
detection region
imaging arrangement
spatial resolution means, mirror
reflection site
35, 35' transmission plane
imaging device, transmission lens
imaging device, reception lens
receiver
transmitter
plane of symmetry
axis of the imaging arrangement
55, 55' reception plane
surface of the imaging arrangement, ring surface
circular path
spiral path
67 control

The invention claimed is:

1. An apparatus for the spatially resolved detection of objects (13) located in a monitored zone (11),
   having a transmission device (43) for the transmission of electromagnetic radiation (17) in a transmission region (19);
   having a reception device (41) for the reception of radiation (25) reflected from a reception region (23), wherein the transmission region (19) and the reception region (23) overlap or intersect in a detection region (27) which is disposed within the monitored zone (11), which covers a detection angle and in which the transmitted radiation (17) is reflected by objects (13), having an imaging arrangement (29) having a radiation reflection surface (61) and disposed in the propagation path of the transmitted radiation (17) and/or of the reflected radiation (25) and which covers the total detection region (27) at the transmission side and/or at the reception side at all times; and
   having spatial resolution means (31) that is arranged in the propagation path of the radiation (17) between a transmitter of the transmission device (43) and the imaging arrangement (29), for the influencing of the propagation direction of the radiation (17, 25) and/or for the operation of the reception device (41), in particular in a time varying manner, such that the position, in particular the spacing, of the detection region (27) relative to the imaging arrangement (29) and/or the size of the detection region (27) determined by the degree to which the transmission region (19) and the reception region (23) overlap or intersect can be changed,
   wherein the detection apparatus provides distance measurement in accordance with the time-of-flight principle and/or in accordance with the phase measurement principle, thereby functioning as a distance measurement unit.

2. An apparatus in accordance with claim 1, characterized in that spatial resolution means (31) at the transmission side and spatial resolution means (31) at the reception side can be operated synchronously or asynchronously, with in particular an asynchronous operation being able to be superimposed on a synchronous base operation of the spatial resolution means (31) at least at times.

3. An apparatus in accordance with claim 1, characterized in that the spatial resolution means (31) are arranged in the propagation path of the radiation (25) between the imaging arrangement (29) and a receiver (41) of the reception device or include means for the spatially resolved operation of a receiver (41) of the reception device in particular designed as a 3D camera.

4. An apparatus in accordance with claim 1, characterized in that the spatial resolution means (31) include at least one movable optical element, in particular a mirror, a prism or a wedge, controllable for the carrying out of deflection movements and/or at least one diffractive optical system controllable for the change of the radiation-refractive behavior and/or at least one receiver (41) which can be operated in a spatially resolved manner, in particular a 3D camera, preferably a PMD sensor.

5. An apparatus in accordance with claim 1, characterized in that the detection angle covered by the detection zone (27) amounts, at least in a transmission plane (35, 35'), to at least 90°.

6. An apparatus in accordance with claim 1, characterized in that the imaging arrangement (29) is designed for the deflection of the transmitted radiation (17) and/or of the reflected radiation (25).

7. An apparatus in accordance with claim 1, characterized in that the imaging arrangement (29) includes at least one surface (61), in particular an at least partly ring-shaped surface, with the angle at which the radiation (17) transmitted by the transmission device is incident onto the surface (61) at the transmission side and/or the angle at which the radiation (25) coming from the surface (61) is incident onto the spatial resolution means (31) at the reception side can in particular be changed by means of the spatial resolution means (31).

8. An apparatus in accordance with claim 1, characterized in that the radiation reflection surface of the imaging arrangement (29) is an at least partly conical mirror.

9. A method for the spatially resolved detection of objects (13) located in a monitored zone (11) comprising;
   using an apparatus which includes a transmission device (43) for the transmission of electromagnetic radiation (17) in a transmission region (19) and a reception device (41) for the reception of radiation (25) reflected from a reception region (23), wherein the transmission region (19) and the reception region (23) overlap or intersect in a detection region (27) which is disposed within the monitored zone (11), which covers a detection angle (27) and in which the transmitted radiation (17) is reflected by objects; and wherein the apparatus includes an imaging arrangement (29) having at least one radiation reflection surface (61) with a spatial resolution means (31), said imaging arrangement (29) is disposed in the propagation path of the transmitted radiation (17) and/or of the reflected radiation (25) and which covers the total detection region (27) at the transmission side and/or at the reception side at all times, and the spatial resolution means (31) is arranged in the propagation path of the transmitted radiation (17) between the transmission device (43) and the imaging arrangement (29);

wherein the propagation path of the radiation (17, 25) is influenced and/or the reception device (41) is operated such that the position, in particular the spacing, of the detection region (24) relative to the imaging arrangement (29) and/or the size of the detection region (27) determined by the degree to which the transmission region (19) and/or the reception region (23) overlap or intersect is/are changed;

and wherein the detection apparatus provides distance measurement in accordance with the time-of-flight principle and/or in accordance with the phase measurement principle, thereby functioning as a distance measurement unit.

10. A method in accordance with claim 9, wherein the spatial resolution means (31) is arranged at the transmission side changing the angle at which the radiation (17) transmitted by the transmission device (43) such that the radiation (17) is incident onto the at least one surface (61) and/or at the reception side the angle at which the radiation (25) coming from the surface (61) is incident onto the spatial resolution means (31).

11. A method in accordance with claim 9, characterized in that a plurality of at least partly circular paths (63) with different radius and/or a path (65) deviating from a circle, in particular a spiral or helical path, is/are described on a surface (61) of the imaging arrangement (29) sequentially at the transmission side by means of the spatial resolution means (31).

12. A method in accordance with claim 9, characterized in that spatial resolution means (31) at the transmission side and spatial resolution means (31) at the reception side are operated synchronously or asynchronously, with in particular an asynchronous operation being superimposed on a synchronous base operation of the spatial resolution means (31) at least at times.

13. A method in accordance with claim 9, characterized in that the position and/or the size of the detection region (27) is changed while the (17) transmitted by the transmission device (43) propagates.

14. A method in accordance with claim 9, characterized in that the size of the detection region (27) is changed such that the intensity of the reflected radiation (25) received by the reception device (41) has a predetermined extend over the propagation of the radiation (17) transmitted by the transmission device (43).

15. A method for the spatially resolved detection of objects (13) located in a monitored zone (11), the method comprising:

using an imaging arrangement (29) having a radiation reflection surface (61), which completely covers a detection region (27) at the transmission side and/or at the reception side at all times, in an apparatus for the spatially resolved detection of objects (13) located in a monitored zone (11), wherein the apparatus includes a transmission device (43) for the transmission of electromagnetic radiation (17) in a transmission region (19) and a reception device (41) for the reception of radiation (25) reflected from a reception region (23), wherein the transmission region (19) and the reception region (23) overlap or intersect in the detection region (27) which is disposed within the monitored zone (11), which covers a detection angle and in which the transmitted radiation (17) is reflected by objects (13);

wherein the imaging arrangement (29) is disposed in the propagation path of the transmitted radiation (17) and/or of the reflected radiation (25);

wherein the apparatus includes a spatial resolution means (31) disposed in the propagation path of the electromagnetic radiation (17) between the transmission device (43) and the imaging arrangement (29), the spatial resolution means (31) influences the propagation direction of the radiation (17, 25) and/or the operation of the reception device (41), in particular in a time varying manner, such that the position, in particular the spacing, of the detection region (27) relative to the imaging arrangement (29) and/or the size of the detection region (27) determined by the degree to which the transmission region (19) and the reception region (23) overlap or intersect can be changed;

and wherein the detection apparatus provides distance measurement in accordance with the time-of-flight principle and/or in accordance with the phase measurement principle, thereby functioning as a distance measurement unit.

16. An apparatus in accordance with claim 1, characterized in that the detection angle covered by the detection zone (27) amounts, at least in a transmission plane (35, 35'), to at least 180°.

17. An apparatus in accordance with claim 1, characterized in that the detection angle covered by the detection zone (27) amounts, at least in a transmission plane (35, 35'), to at least 360°.

18. A method in accordance with claim 9, wherein in the radiation reflection surface (61) of the imaging arrangement (29) is at least partly ring-shaped.

19. A method in accordance with claim 15, wherein the radiation reflection surface (61) is at least partly from a conical shaped mirror.

\* \* \* \* \*